No. 80,536.
PATENTED AUG. 4, 1868.
S. DRIVER.
AUTOMATIC BOILER FEEDER.
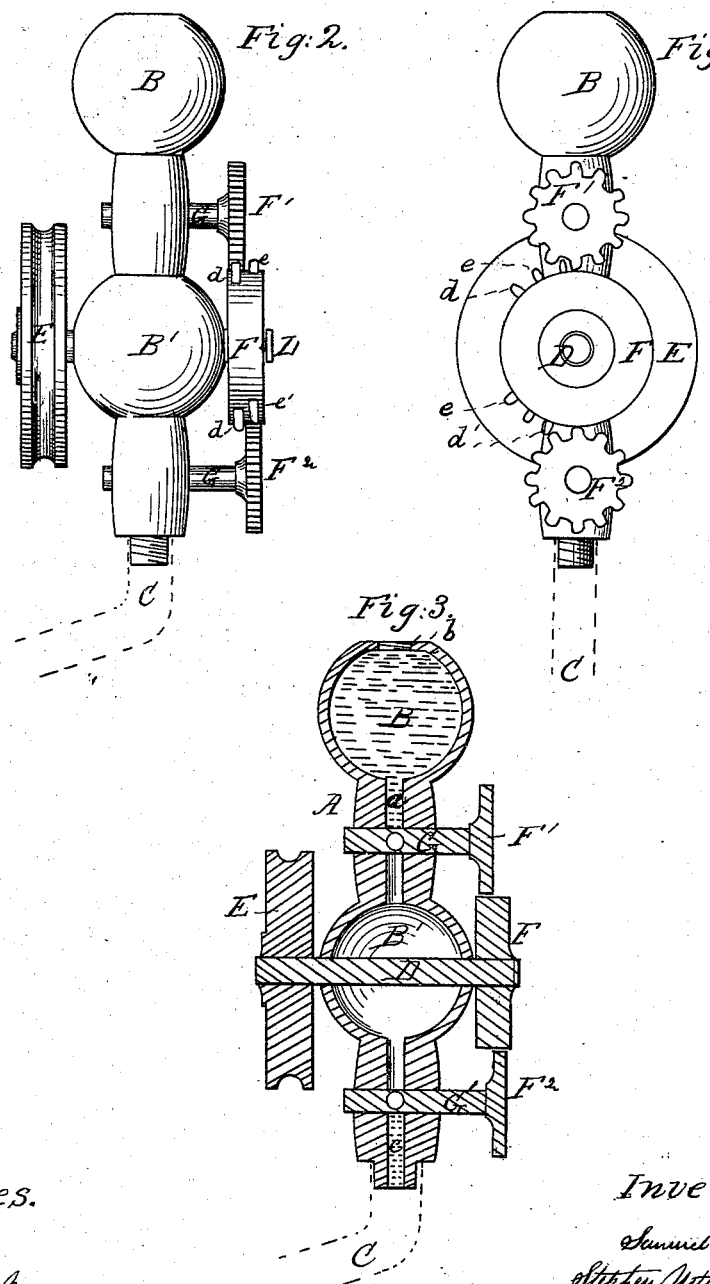
Witnesses.
Inventor.

United States Patent Office.

SAMUEL DRIVER, OF PHILADELPHIA, PENNSYLVANIA, ASSIGNOR TO HIMSELF AND ROBERT H. DRIVER, OF SAME PLACE.

*Letters Patent No. 80,536, dated August 4, 1868.*

IMPROVEMENT IN AUTOMATIC BOILER-FEEDERS.

*The Schedule referred to in these Letters Patent and making part of the same.*

TO ALL WHOM IT MAY CONCERN:

Be it known that I, SAMUEL DRIVER, of the city and county of Philadelphia, and State of Pennsylvania, have invented a new and useful Improvement in Automatic Boiler-Feeders; and I do hereby declare that the following is a full and exact description thereof, reference being had to the accompanying drawings, and to the letters of reference marked thereon.

The nature of my invention consists of an automatic boiler-feeder, so constructed and arranged in relation to the feed-pipe and boiler as to convey the water from the former to the latter at regular intervals, and keep up a regular height of water, the apparatus consisting of two receivers, arranged vertically with each other, and having their communication with each other, and with the feed-pipe and boiler, each opened and closed alternately by means of revolving valves, whose shafts have an intermittent gearing, with a central shaft, which is driven by the steam-engine or intermediate shaft.

The arrangement and operation of the apparatus will be understood by the following description.

In the accompanying drawings—

Figure 1 is a front elevation of the apparatus.

Figure 2 is a side view at right angles to the same.

Figure 3 is a vertical section at the line $a\,b$ of fig. 1.

Like letters in all the figures indicate the same parts.

A is a casting, which has chambers, B and B', which have a communicating-passage, $a$.

The feed-pipe, which is not shown in the drawings, has communication with the chamber B by means of the opening $b$, with which one end is connected, and the chamber B' has communication with the supply-pipe C, represented by dotted lines, by means of the passage $c$.

D is a driving-shaft, which passes through the chamber B', and should be provided with stuffing-boxes.

On one end of said shaft there is a pulley, E, which, by means of a belt, has connection with the driving-shaft of the engine, or an intermediate shaft.

On the other end of said shaft D there is a wheel, F, which has two series of teeth, $d\,d\,d$ and $d'\,d'\,d'$, by means of which it has an intermittent gearing with pinion $F^1$, on the projecting end of the rotary valve G, which communicates with the passage $a$.

There are two other series of teeth, $e\,e\,e$ and $e'\,e'\,e'$, in another line of the wheel F, which have a like intermittent gearing with the pinion $F^2$, on the projecting end of the rotary valve G'.

The operation is as follows:

As the shaft D revolves in the direction of the arrow, by means of the series of teeth above mentioned, it has an intermittent action, respectively, on the valves G and G' through the pinions $F^1\,F^2$, so as to open and close the passages $a$ and $c$ alternately. Consequently, when the passage $a$ is closed above the valve G, and the valve G' being open, the water in the chamber B' descends into the boiler, and steam will take its place, and before the valve G is opened, the valve G' is closed, as represented in fig. 3, to cut off the pressure of steam from the boiler. And when the valve G is opened, the water presses forward from the chamber B and feed-pipe, and condenses the steam in the chamber B', and takes its place. The alternate action of the valves is thus kept up, by which a regular supply of water is kept up, and the supply-pipe communicating with the boiler at the water-line, the regular depth of water is maintained.

What I claim as my invention, and desire to secure by Letters Patent, is—

The combination and arrangement of the chambers B and B' and valves G and G', provided with pinions $F^1$ and $F^2$, and operated by means of the wheel F, on the driving-shaft D, substantially in the manner above described.

In testimony whereof, I have hereunto set my hand and affixed my seal, this third day of January, 1868.

SAMUEL DRIVER. [L. S.]

Witnesses:
STEPHEN USTICK,
JOHN WHITE.